(12) United States Patent
Youssef et al.

(10) Patent No.: US 8,082,091 B2
(45) Date of Patent: Dec. 20, 2011

(54) METHOD FOR CONTROLLING A TURBOCHARGER USING A PHYSICAL MODEL OF THE TURBOCHARGER SPEED

(75) Inventors: Bilal Youssef, Rueil-Malmaison (FR); Philippe Moulin, Paris (FR)

(73) Assignee: IFP, Cedex (FR)

( * ) Notice: Subject to any disclaimer, the term of this patent is extended or adjusted under 35 U.S.C. 154(b) by 754 days.

(21) Appl. No.: 12/238,480

(22) Filed: Sep. 26, 2008

(65) Prior Publication Data

US 2009/0090107 A1    Apr. 9, 2009

(30) Foreign Application Priority Data

Sep. 28, 2007   (FR) ...................................... 07 06854

(51) Int. Cl.
*F02D 23/00*    (2006.01)
*F02C 6/12*    (2006.01)
(52) U.S. Cl. .......................................... 701/102; 60/602
(58) Field of Classification Search .................. 701/102, 701/101, 110, 115; 60/600–603
See application file for complete search history.

(56) References Cited

U.S. PATENT DOCUMENTS

| | | | |
|---|---|---|---|
| 4,961,319 A * | 10/1990 | Lyon | ................................ 60/602 |
| 6,067,800 A | 5/2000 | Kolmanovsky et al. | |
| 6,898,933 B2 * | 5/2005 | Klingseis | ........................ 60/602 |
| 6,918,250 B2 * | 7/2005 | Baeuerle | .......................... 60/602 |
| 2003/0101723 A1 | 6/2003 | Birkner et al. | |

FOREIGN PATENT DOCUMENTS

| | | |
|---|---|---|
| EP | 1 586 756 A1 | 10/2005 |
| FR | 2 898 156 A | 9/2007 |
| FR | 2922596 A1 * | 4/2009 |

* cited by examiner

*Primary Examiner* — Hieu T Vo
(74) *Attorney, Agent, or Firm* — Antonelli, Terry, Stout & Kraus, LLP.

(57) ABSTRACT

A method for controlling a turbocharger using a physical model of the turbocharger speed is disclosed with an application for controlling an internal-combustion engine. A setpoint pressure corresponding to a fluid pressure in the engine intake manifold is converted to a desired speed value. A physical relation connecting the turbocharger speed to a pressure ratio of the fluid flowing into and out of the turbine is then defined. A desired pressure ratio for the fluid flowing into and out of the turbine is deduced therefrom. A turbine actuator control law is estimated by mapping the turbine, from a measurement of the fluid flow rate flowing into the turbine and from the desired ratio of the pressures in the turbine. Finally, the control law is applied to the turbine actuator so that the pressure in the intake manifold is equal to the setpoint pressure.

21 Claims, 5 Drawing Sheets

METHOD FOR CONTROLLING A TURBOCHARGER USING A PHYSICAL MODEL OF THE TURBOCHARGER SPEED

BACKGROUND OF THE INVENTION

1. Field of the Invention

The present invention relates to the field of control of an internal-combustion engine, and more particularly control of a turbocharger system such an engine is provided with

2. Description of the Prior Art

Newly developed technologies for internal-combustion engines increasingly involve advanced engine control systems. In this context, new fluid system architectures require the development of new control strategies for the turbocharger system.

Control strategies for turbocharger systems based on static mapping with linear controllers are currently developed to control such a system. However, these strategies appear to be inadequate as they have the drawbacks as follows:
- lack of robustness in relation to dispersions of the actuators and of the components,
- great development effort: which on the one hand requires all of the static maps to be filled manually and on the other hand the regulator gains must vary depending on the operating point, and
- interactions of the turbocharger system with the other engine sub-systems are not taken into account (therefore a change in the development of these sub-systems requires complete readjustment of the turbocharger regulator).

Conventional strategies based on static mapping with proportional integral (PI) controllers are therefore inadequate. The introduction of control structures based on a model seems to be efficient and promising in order to meet this problem and to replace conventional linear controllers. In this context, several model-based approaches have already been provided in:

Schwarzmann, D., Nitsche, R., Lunze, J. "Diesel Boost Pressure Control Using Flatness-Based Internal Model Control". SAE paper 2006-01-0855, Stefanopoulo, A. G, Kolmanowsky, I., Freudenberg, J. S. "Control of Variable Geometry Turbocharged Diesel Engines for Reduced Emissions". IEEE transactions on control systems technology, vol. 8 No. 4 July 2000.

These strategies are based on models, that is physical, graphic or more generally mathematical representations of relations that really exist or that, by hypothesis, seem to exist between phenomena or between the various elements of the turbocharger system.

However, these models, described in the literature and intended to be used in a control law, involve two major drawbacks: on the one hand, they have too great complexity, which leads to adjustment problems, and on the other hand they do not take account of the dynamics. In fact, these conventional turbocharger regulation methods are based on mappings corresponding to static operating points. One then assumes that, in dynamics, the system goes through a succession of stationary (quasi-static) states.

SUMMARY OF THE INVENTION

The invention is an alternative method for controlling a turbocharger under dynamic conditions which are easy to regulate and to adjust.

The method according to the invention allows controlling a turbocharger. The method comprises a turbine and an internal-combustion engine, wherein a setpoint pressure $P_i^C$ corresponding to a fluid pressure in an intake manifold of the engine is determined. The method comprises the following stages:
- converting setpoint pressure $P_i^C$ to a desired speed value $N_d$;
- defining a physical relation connecting a speed N of the turbocharger to a ratio $PR_t$ of a fluid pressure at the turbine outlet to a fluid pressure at the turbine inlet;
- calculating a desired ratio $PR_t^C$ of the pressure in the turbine, by applying the relation to the desired speed value $N_d$;
- estimating a control law $U_{VGT}^C$ for a turbine actuator using a map of the turbine representing an evolution of a fluid flow rate $W_t$ flowing into the turbine as a function of the pressure ratio in the turbine, $PR_t$, for various actuator control laws, and from a measurement of the fluid flow rate $W_t^m$ flowing into the turbine and from the desired pressure ratio in the turbine $PR_t^C$; and
- applying control law $U_{VGT}^C$ to the turbine actuator so that pressure Pi in the intake manifold is equal to setpoint pressure $P_i^C$.

The turbine actuator can correspond to a wastegate type valve (fixed-geometry turbocharger) or to the blades of the turbine (variable-geometry turbocharger).

A map of a compressor associated with the turbocharger can be used to convert setpoint pressure ($P_i^C$) to a desired speed value ($N_d$).

According to the invention, the physical relation can be defined from an equilibrium relation between a turbine power and a compressor power, by applying a mass equilibrium principle in the intake manifold and an exhaust manifold, and by applying a back-stepping technique wherein a control that forces the turbocharger speed to follow a given dynamics is defined. The dynamics can be exponential and it can be expressed as follows:

$$\frac{d(N-N_d^2)}{dt} = -\mu(N-N_d^2)$$

where μ is an experimentally defined gain.

The control law can be estimated by approximating the turbine map. The turbine map can be approximated by equations of the type as follows:

$$W_t = (a.G(U_{VGT})+b).\Psi(Pr_t)$$

with:
a, b: two parameters to be identified
$U_{VGT}$: an actuator control law
$G(U_{VGT})$: a bijective polynomial function of $U_{VGT}$ $$\Psi(PR_t) = \sqrt{\frac{2\gamma \cdot PR_t}{\gamma(\gamma-1)}} \cdot \sqrt{PR_t^{\frac{-2}{\gamma}} - PR_t^{\frac{-\gamma-1}{\gamma}}}$$

γ: specific heat ratio.

The two parameters a and b can be identified by offline optimization, and they can be corrected on line by an integrator, so that the turbine pressure ratio $PR_t$ follows the desired ratio $PR_t^C$.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

Figure 1:
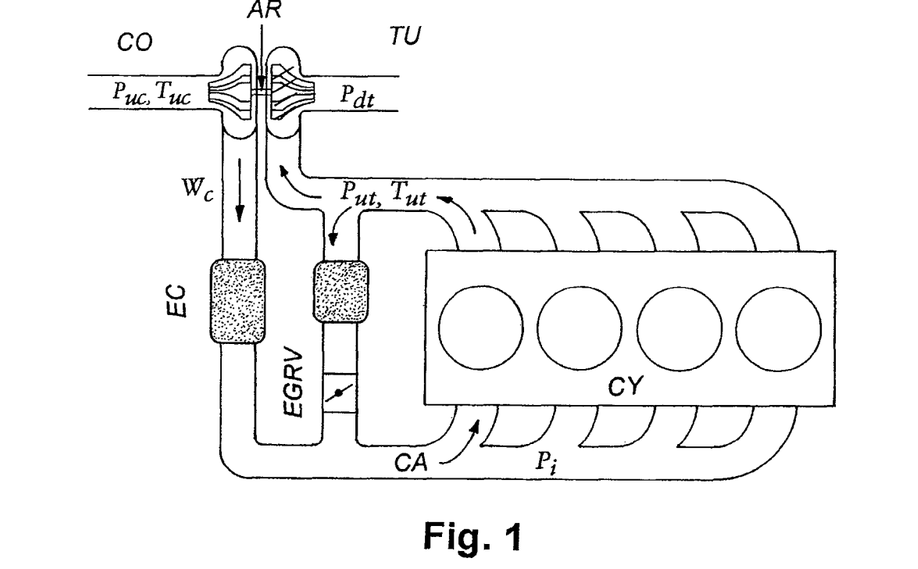
FIG. 1 diagrammatically shows an engine comprising a turbocharger.

FIG. 1 diagrammatically shows an engine equipped with a turbocharger. A turbocharger is an element that can be integrated into an internal-combustion engine. Such a system increases the pressure of the gas allowed into the engine. The turbocharger thus allows better filling of the cylinders. The operational principle is to recover part of the kinetic energy contained in the exhaust gas.

A turbine (TU), which is arranged in the exhaust gas stream leaving the engine, is driven at high speed. It is connected by a shaft (AR) to a compressor (CO) arranged in the intake manifold (CA) of the engine. This compressor sucks in and compresses the ambient air, sends the compressed air to cylinders (CY), possibly passes the compressed air through a heat exchanger (EC) to provide cool thereof. The cylinders are thus improved by sending compressed air therein. The amount of oxidizer/fuel mixture, and therefore the engine power is thus increased.

The turbine is a variable-geometry turbine. The engine can also comprise an EGR valve (EGRV) for recovering part of the burnt gas.

According to the invention, the turbocharger is controlled through the regulation of pressure Pi in the intake manifold, by modifying the turbine geometry. This pressure is regulated by a regulator that is controlled by an electronic housing according to a stored map. A map is a set of data stored in the engine calculator. It serves as a reference for the calculator for optimum control of its software which is referred to as regulator.

Thus, an optimum pressure in the intake manifold is determined according to the engine operating conditions and to the expected performances. This value is referred to as setpoint value and it is denoted by $P_i^C$.

The goal of the control process is thus to modify the turbine geometry so that pressure Pi in the intake manifold is equal to setpoint pressure $P_i^C$.

A control law controlling the turbine actuator is used to modify the geometry of the turbine. This actuator, by changing its position, modifies the flow rate $W_t$ of the fluid flowing into the turbine and consequently the flow rate $W_C$ of the fluid downstream from the compressor. Such a control law is denoted by $U_{VGT}$.

Figure 2:
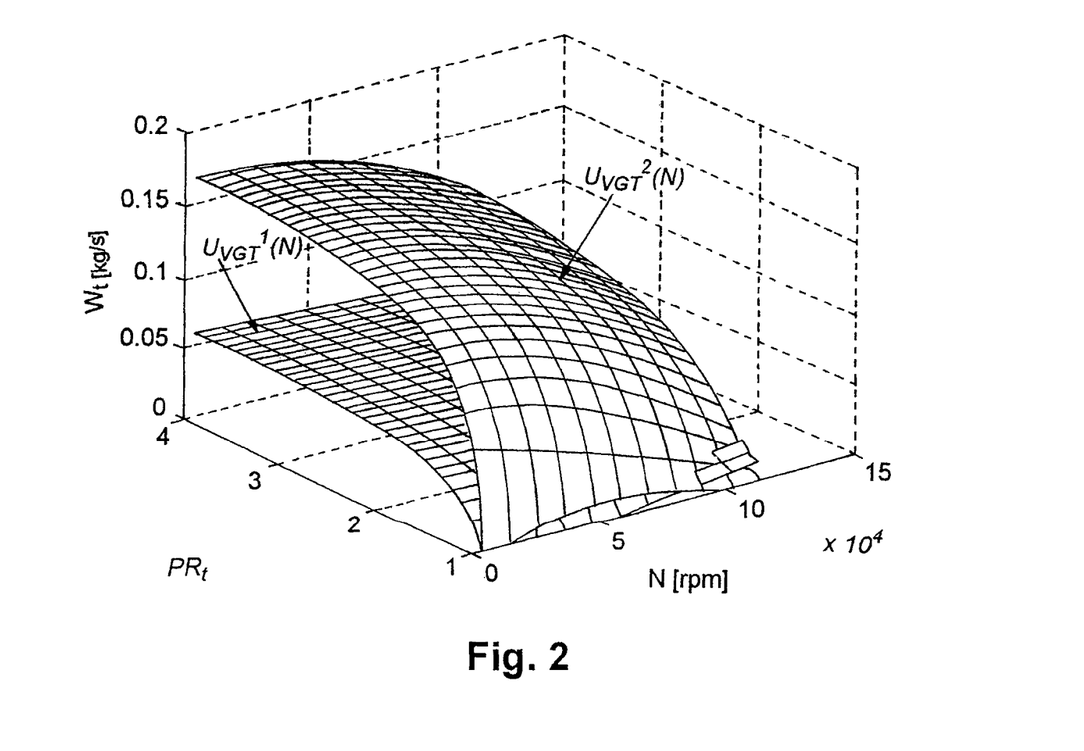
FIG. 2 illustrates a map of the turbine.

A map of the turbine is provided by the manufacturer. This map represents the evolution of the fluid flow rate $W_t$ flowing into the turbine as a function of the pressure ratio PRt in the turbine for various control laws $U_{VGT}^1$, $U_{VGT}^2$, $U_{VGT}^3$, . . . as illustrated by FIG. 2.

The pressure ratio PRt in the turbine corresponds to the ratio of the pressure downstream from the turbine to the pressure upstream from the turbine.

Figure 3:
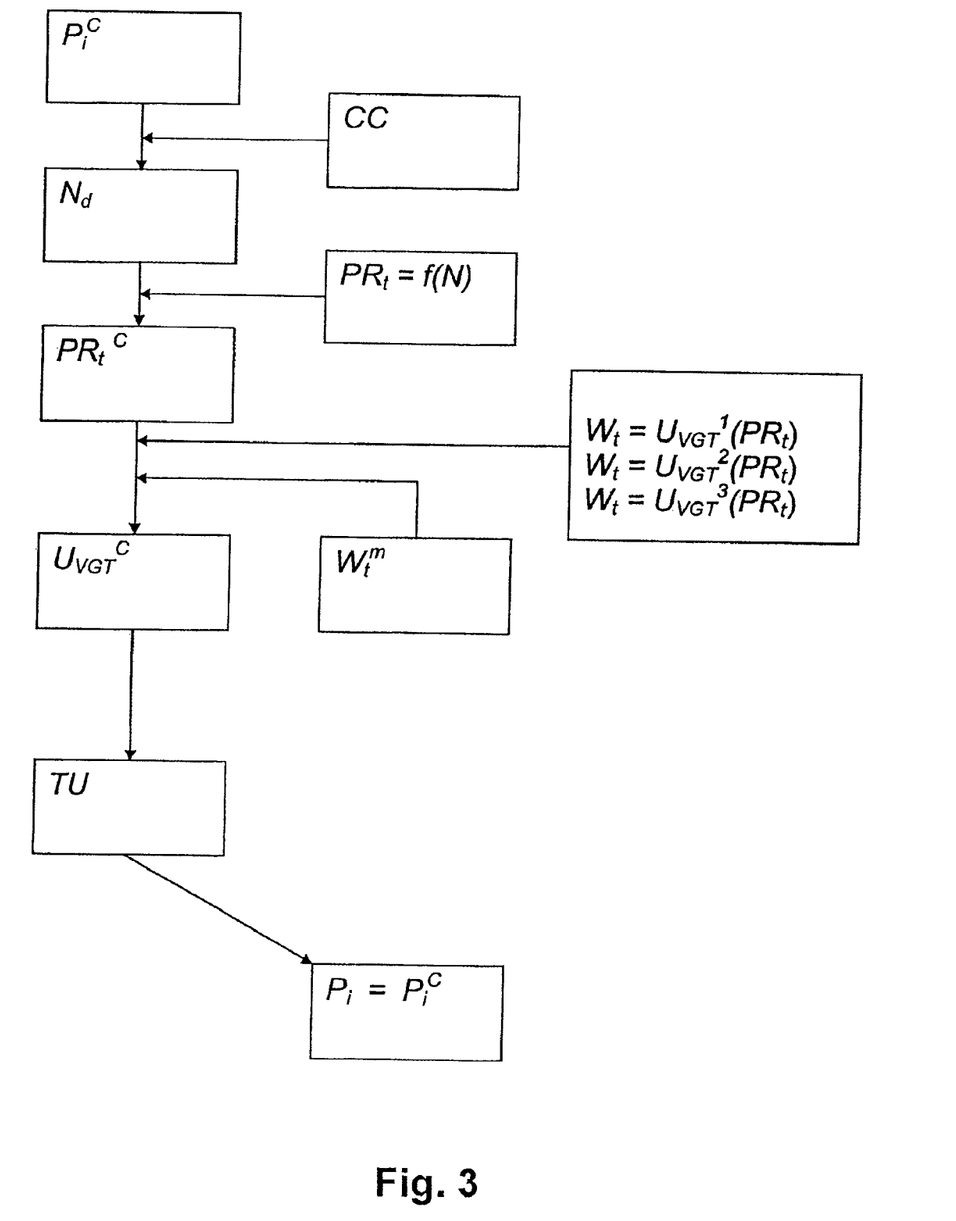
FIG. 3 illustrates the method of controlling a turbocharger.

The method according to the invention allows determination of a control law for the turbine actuator, $U_{VGT}^C$, by means of a map of the turbine and of a physical model describing the turbocharger dynamics. FIG. 3 illustrates the method that mainly comprises four stages:

1—Physical model of the evolution of the turbocharger speed (N);

2—Conversion of the setpoint pressure ($P_i^C$) to the desired speed (Nd);

3—Definition of a control law for the turbine actuator, $U_{VGT}^C$; and

4—Modification of the turbine geometry according to control law $U_{VGT}^C$.

In accordance with FIG. 1, the following notations are used in the description:

| | |
|---|---|
| $T_{ut}$ | Temperature upstream from the |
| $T_{uc}$ | Temperature upstream from the |
| $P_{dt}$ | Pressure downstream from the |
| $P_{ut}$ | Pressure upstream from the |
| $P_{uc}$ | Pressure upstream from the |
| $W_c$ | Fluid flow rate downstream from |
| $P_i$ | Pressure in the intake manifold |
| N | Turbocharger speed |
| $PR_t$ | Pressure ratio in the turbine |

It can be noted that "downstream" means "at the outlet" and that "upstream" means "at the inlet". The pressure and the temperature characterize the air. The following notations are also adopted:

| | | | |
|---|---|---|---|
| T | Time | r | Gas constant |
| $PR_c$ | Compressor pressure | $C_p$ | Specific heat |
| J | Turbo inertia | $T_{ref}$ | Reference |
| $P_t$ | Turbine power | $P_{ref}$ | Reference |
| $P_c$ | Compressor power | $M_e$ | Exhaust |
| $W_t$ | Turbine flow rate | $M_i$ | Intake manifold |
| $W_t$ | Turbine flow rate | $N_d$ | Desired turbo |
| $\eta_t$ | Turbine efficiency | $\gamma$ | Specific heat |
| $\eta_c$ | Compressor efficiency | | |

It can also be noted that what is referred to as fluid is any mixture circulating in the engine manifolds and in the turbocharger. It can, for example, be a mixture comprising at least one of the following elements: air, exhaust gas, over-pressure gas, . . .

1—Physical Model of the Evolution of the Turbocharger Speed (N)

According to the invention, the physical model describing the turbocharger dynamics is a physical model that describes the pressure ratio in the turbine, $PR_t$, as a function of at least the turbocharger speed. The physical model that describes the pressure ratio in the turbine can be a function of:

the speed, the inertia and the power of the turbocharger, and
the flow rate of the turbine and the temperature upstream from the turbine.

According to an embodiment, the model used has the following form:

$$PR_t = T_0(J, W_t, C_p, \eta_t, T_{ut})(T_1(N) + T_2(N) + T_3(J, P_c) + T_4(N))$$

with:

$T_1(N)$ being a term relative to the desired acceleration of the turbocharger shaft (AR);

$T_2(N)$ being a term relative to a law describing the power drawn by the compressor from the turbocharger shaft;

$T_3(J, P_c)$ being a term relative to the desired turbocharger dynamics;

$T_4(N)$ being an optional term allowing to compensate for modelling errors; and $T_0$ being a term corresponding to the inversion between the power supplied to the turbine and the expansion ratio at the boundaries thereof.

Using the following notations:

y is the speed squared ($N^2$);

$y_d$ is the desired speed squared ($N_d^2$); and

μ is an experimentally defined gain which allows defining a physical model of the evolution of the turbocharger speed (N) using the following relation:

$$1 - \left(\frac{1}{PR_t}\right)^{\frac{\gamma-1}{\gamma}} = \frac{1}{\alpha_t}\left(\frac{dy_d}{dt} - \mu(y - y_d) + \beta_c + \lambda \int (y - y_d)\right) \quad (1)$$

wherein:

$$\frac{dy_d}{dt}$$

is acceleration of the turbocharger shaft (AR);

$-\mu(y-y_d)$ is an exponential law describing the desired speed dynamics;

$$\beta_c = \frac{2}{J} P_c$$

is a term representing the compressor power, for a quasi-static compensation;

$\lambda \int (y-y_d)$ is an integral term for compensating for modelling errors; and $$\alpha_t = \frac{2}{J} W_t C_p \eta_t T_{ut}$$

is a term representing the ratio between the turbine power and $$1 - \left(\frac{1}{PR_t}\right)^{\frac{\gamma-1}{\gamma}}$$

A method for constructing the model is described hereafter.

Construction of the Physical Model

In order to physically model the turbocharger dynamics, is assumed that the evolution of the turbocharger speed (N) is obtained from the equilibrium of the turbine ($P_t$) and compressor ($P_c$) powers:

$$P_t - P_c = J \cdot N \cdot \frac{dN}{dt} \quad (2)$$

The friction losses are disregarded. J is the moment of inertia of the rotating parts of the turbocharger (compressor and turbine shaft and wheels).

By applying the mass equilibrium principle in the intake and exhaust manifolds and considering that the intake and exhaust manifold dynamics are faster than those of the turbocharger, it can be written:

$$W_t = W_c + W_f \quad (3)$$

$W_f$ is a low flow rate due to the injection of fuel into the cylinders.

A relation allowing expression of the turbocharger speed (N) as a function of the pressure ratio and of the compressor flow rate ($PR_c$) is deduced therefrom:

$$N = f_5\left(W_c \frac{\sqrt{T_{uc}} \, P_{ref}}{\sqrt{T_{ref}} \, P_{uc}}, PR_c\right) \frac{\sqrt{T_{uc}}}{\sqrt{T_{ref}}} \quad (4)$$

Function $f_5$ can be defined by mapping on test bench.

Then, a control law is elaborated from this representation, using a back-stepping technique.

Back-stepping is a technique allowing defining controllers for non-linear systems. It is a recursive technique based on the recurring synthesis of Lyapunov functions, which provides stepwise stabilization of each stage of the system. At each stage of the process, a virtual control is thus generated to provide convergence of the system towards its state of equilibrium. This technique also allows construction of an adaptive controller. It is described in the following document:

Kristicacute M., Kanellakoupoulos I., Kokotovic P. V. "*Nonlinear and Adaptive Control Design*", Control System Technology and Automation. Wiley, 1995.

A control forcing the turbocharger speed to follow a given dynamics is therefore defined with a back-stepping technique. An exponential dynamics expression as follows can for example be selected:

$$\frac{d(y - y_d)}{dt} = -\mu(y - y_d) \quad (5)$$

with:

y being the speed squared ($N^2$);

$y_d$ being the desired speed squared ($N_d^2$); and

μ being an experimentally defined gain.

Applying a back-stepping technique with the previous dynamics gives:

$$u_t = \frac{1}{\alpha_t}\left(\frac{dy_d}{dt} - \mu(y - y_d) + \beta_c\right)$$

wherein:

$$\alpha_t = \frac{2}{J} W_t C_p \eta_t T_{ut}$$

$$\beta_c = \frac{2}{J} P_c$$

$$u_t = 1 - \left(\frac{1}{PR_t}\right)^{\frac{\gamma-1}{\gamma}}$$

$$y = N^2$$

It can be noted that parameters $\alpha_t$ and $\beta_t$ defined above can be calculated using the measured variables and the turbocharger efficiency maps. Since the turbine and compressor efficiencies vary slowly with the turbocharger speed, they can be considered to be constant in the control law.

An integral term can be added to the model to compensate for modelling errors. The final control law is then obtained:

$$1 - \left(\frac{1}{PR_t^d}\right)^{\frac{\gamma-1}{\gamma}} = \frac{1}{\alpha_t}\left(\frac{dy_d}{dt} - \mu(y - y_d) + \beta_c + \lambda \int (y - y_d)\right)$$

2—Conversion of the Setpoint Pressure ($P_i^C$) to the Desired Speed ($N_d$)

The goal of the control process is to modify the geometry of the turbine so that pressure Pi in the intake manifold is equal to setpoint pressure $P_i^C$.

A map of the turbine is provided by the manufacturer. This map represents the evolution of the fluid flow rate $W_t$ flowing into the turbine as a function of the pressure ratio PRt in the turbine for various control laws $U_{VGT}^1$, $U_{VGT}^2$, $U_{VGT}^3$, . . .

The physical model associates the turbocharger speed (N) with the pressure ratio PRt in the turbine.

It is therefore necessary to carry out a conversion of the setpoint pressure in the intake manifold to a setpoint value for the turbocharger speed. Setpoint pressure ($P_i^C$) is thus converted to desired speed ($N_d$).

This conversion is achieved from the compressor map (CC) provided by the manufacturer. It is a curve allowing determination of the speed as a function of the pressure in the intake manifold.

3—Definition of a Control Law for the Turbine Actuator $U_{VGT}^C$

The goal of this stage is to generate the real control controlling the turbine actuator and allowing control of the turbocharger. This control is denoted by $U_{VGT}^C$.

According to setpoint pressure $P_i^C$, the desired speed $N_d$ is determined. Then a desired pressure ratio in the turbine, $PR_t^C$, is calculated using the physical model.

The fluid flow rate entering the turbine, $W_t^m$, is also measured.

A map of the turbine is provided by the manufacturer. This map represents the evolution of the fluid flow rate $W_t$ flowing into the turbine as a function of the pressure ratio PRt in the turbine for various control laws $U_{VGT}^1$, $U_{VGT}^2$, $U_{VGT}^3$, . . .

Finally, the control law for the turbine actuator, $U_{VGT}^C$, is estimated from the map, $PR_t^C$ and $W_t^m$.

This can be done by approximating the turbine map by means of the following equations:

$$W_t = (a \cdot G(U_{VGT}) + b) \cdot \Psi(PR_t) \quad (6)$$

where:

$G(U_{VGT})$ is a bijective polynomial function of $U_{VGT}$ and $$\Psi(PR_t) = \sqrt{\frac{2\gamma \cdot PR_t}{\gamma(\gamma - 1)}} \cdot \sqrt{PR_t^{\frac{-2}{\gamma}} - PR_t^{\frac{-\gamma-1}{\gamma}}} \quad (7)$$

It is thus possible to estimate $U_{VGT}^C$ with: $PR_t = PR_t^C$.

The two parameters a and b can be identified by offline optimization using the characteristics of the turbine. These two parameters depend on the turbocharger speed, but this dependency is slow and it can be taken into account in the control strategy.

In practice, parameter b can be corrected on line by an integrator, so that the turbine pressure ratio follows the desired ratio.

The interpretation of equations (6) and (7) is that the turbine can be represented as an orifice with a section depending on control $U_{VGT}$. The standard equation giving the flow rate as a function of the pressure ratio has been modified so that the model considered represents the characteristic of the turbine better.

Figure 4:
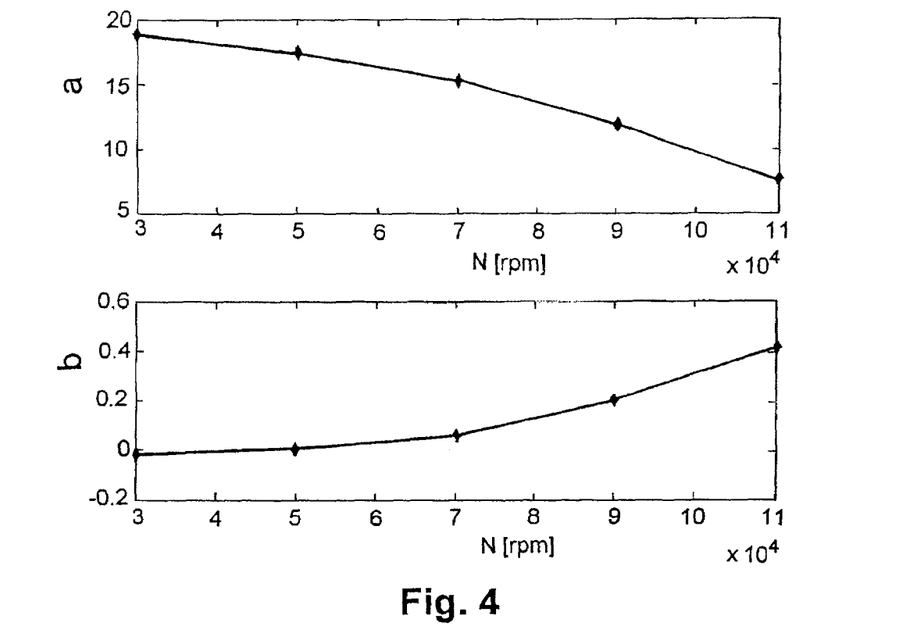
FIG. 4 shows the two parameters a and b as a function of the modified turbocharger speed.

FIG. 4 shows the two parameters a and b as a function of the modified turbocharger speed (N).

Figure 5:
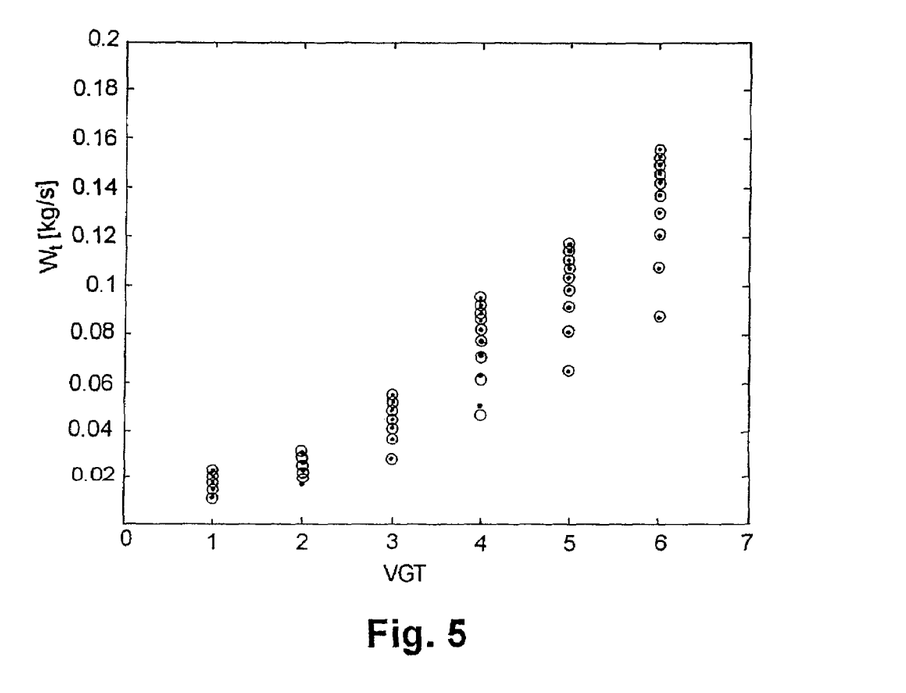
FIG. 5 shows a comparison between the turbine flow rate given by the manufacturer (circle) and the estimation (cross)

FIG. 5 shows a comparison between the turbine flow rate given by the manufacturer (circle) and the estimation (cross), according to the position of the turbine actuator (VGT). An excellent correlation is observed.

4—Modification of the Turbine Geometry According to Control Law $U_{VGT}^C$

The last stage applies the control law $U_{VGT}^C$ to the turbine actuator to modify the geometry of the turbine. This actuator, as it changes position, modifies the flow rate of the fluid flowing into the turbine, so that pressure Pi in the intake manifold is equal to setpoint pressure $P_i^C$.

The actuator can be a wastegate type valve in the case of a fixed-geometry turbocharger, or blades (actuator referred to as VGT) of the turbine in the case of a variable-geometry turbocharger.

Results

Figure 6A:
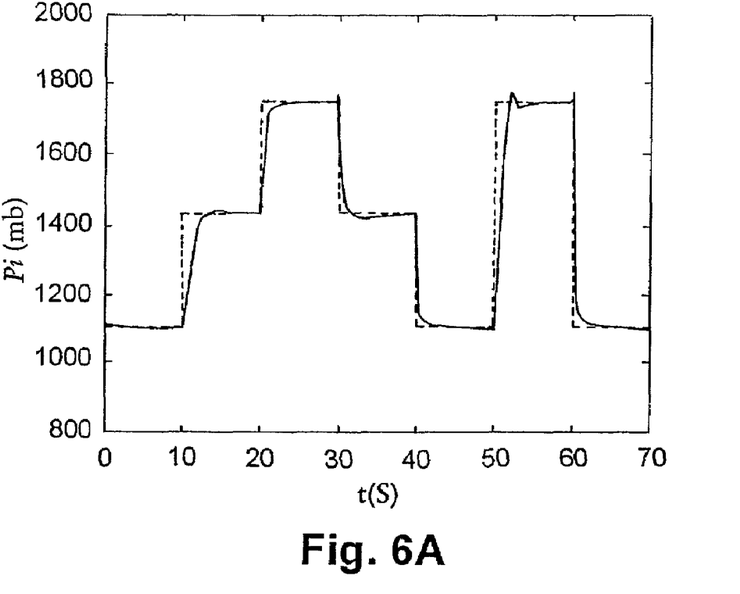
FIGS. 6A to 6D illustrate results of the control method according to the invention.
Figure 6B:
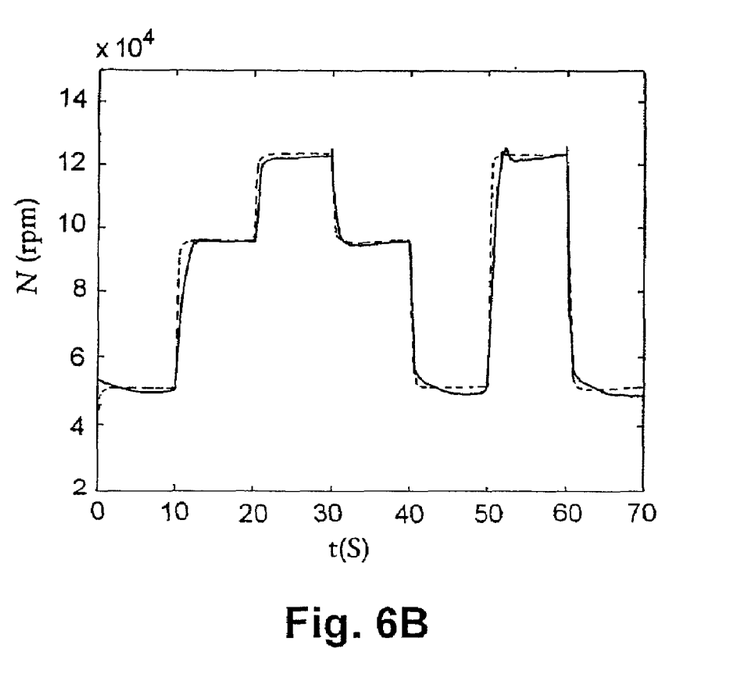
Figure 6C:
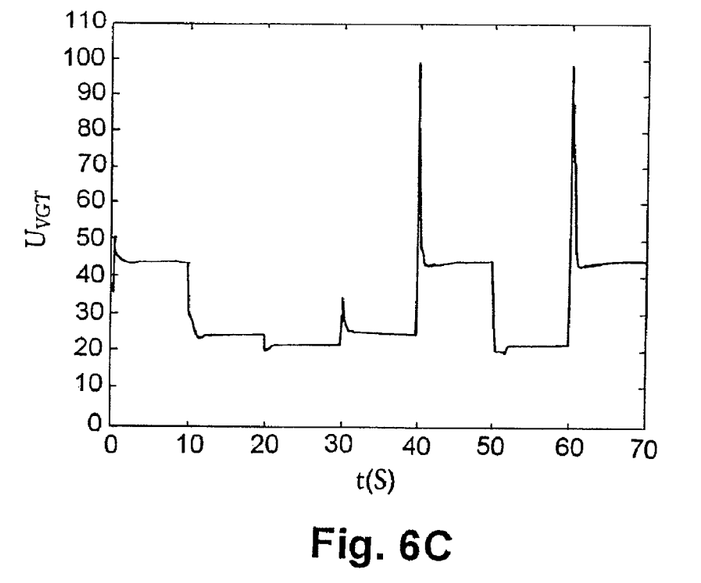
Figure 6D:
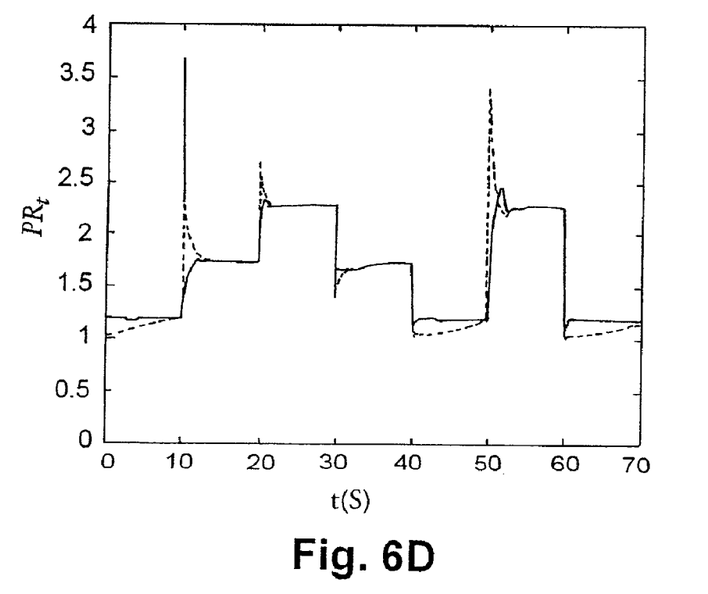

FIGS. 6A to 6B illustrate control results according to the invention. The curves of a solid line represent the real measurements and the curves of a dotted line represent the estimation according to the method. FIG. 6A shows the evolution of pressure Pi in the intake manifold as a function of time t. FIG. 6B shows the evolution of the turbocharger speed (N) as a function of time t. FIG. 6C shows the evolution of control law $U_{VGT}^C$ as a function of time t. Finally, FIG. 6D shows the evolution of the pressure ratio in the turbine (PRt) as a function of time t.

These results show the performance of the method: The prepositioning given by the control law allows dynamically defining a desired exhaust pressure that is converted to a VGT control allowing rapid following of the trajectory of the desired speed obtained from the trajectory of the intake pressure required.

Advantages

The method allows using a linear and therefore simple control law which is easy to adjust without having to vary its parameters according to the operating point of the system (valid under dynamic conditions). The method thus affords various advantages:

it allows facilitating adjustment of the regulator, regarding static aspects (prepositioning) as well as dynamic aspects;

the use of physical quantities or characterization quantities in the model leads to a decrease in the number of tests required for adjustment;

the interactions between the considered system and the other sub-systems of the engine (EGR, combustion or even external conditions) are taken into account in the model, which allows adjustment of the regulator to be independent of these other sub-systems;

conventional turbocharger regulation methods are based on maps corresponding to static operating points. It is then assumed that, under dynamic conditions, the system goes through a succession of stationary states (quasi-static). With the control law, the model is valid under dynamic conditions and this hypothesis is no longer required; and the control law can be generalized to several turbocharger technologies: fixed-geometry turbochargers (the actuator being a wastegate type valve), and turbochargers with variable-geometry turbine (the actuator is the blades of the turbine). It can readily adjust to various system configurations by accounting for physical equations: double-stage turbocharger, engine with HP or LP EGR, variable-intake engine.

The invention claimed is:

1. A method for controlling a turbocharger associated with an internal combustion engine including a turbine, wherein a setpoint pressure corresponding to a fluid pressure in an intake manifold of the engine is determined, comprising:
converting the setpoint pressure to a desired speed value;
defining a physical relation associating a speed of the turbocharger to a ratio of a fluid pressure at an outlet of the turbine to a fluid pressure at an inlet of the turbine;
calculating a desired ratio of the pressure in the turbine by applying the physical relation to the desired speed value;
estimating a control law for a turbine actuator using a map of the turbine representing an evolution of a fluid flow rate flowing into the turbine as a function of a pressure ratio in the turbine, from a measurement of the fluid flow rate flowing into the turbine and from the desired pressure ratio in the turbine; and
applying the control law to the turbine actuator so that pressure in the intake manifold is equal to the setpoint pressure.

2. A method as claimed in claim 1, wherein the actuator is a wastegate valve.

3. A method as claimed in claim 2, wherein the setpoint pressure is converted to a desired speed value using maps of a compressor associated with the turbocharger.

4. A method as claimed in claim 3, wherein the physical relation is obtained from an equilibrium relation between turbine power and compressor power, by using a mass equilibrium principle for the intake manifold and for an exhaust manifold and using a back-stepping technique wherein a control is defined providing the turbocharger speed which follows a given dynamic operation.

5. A method as claimed in claim 4, wherein an exponential dynamic operation expressed as follows is selected:

$$\frac{d(N - N_d^2)}{dt} = -\mu(N - N_d^2)$$

and $\mu$ is an experimentally defined gain.

6. A method as claimed in claim 2, wherein the physical relation is obtained from an equilibrium relation between turbine power and compressor power, by using a mass equilibrium principle for the intake manifold and for an exhaust manifold and using a back-stepping technique wherein a control is defined providing the turbocharger speed which follows a given dynamic operation.

7. A method as claimed in claim 6, wherein an exponential dynamic operation expressed as follows is selected:

$$\frac{d(N - N_d^2)}{dt} = -\mu(N - N_d^2)$$

and $\mu$ is an experimentally defined gain.

8. A method as claimed in claim 1, wherein the actuator comprises blades of the turbine.

9. A method as claimed in claim 8, wherein the setpoint pressure is converted to a desired speed value using maps of a compressor associated with the turbocharger.

10. A method as claimed in claim 8, wherein the physical relation is obtained from an equilibrium relation between turbine power and compressor power, by using a mass equilibrium principle for the intake manifold and for an exhaust manifold and using a back-stepping technique wherein a control is defined providing the turbocharger speed which follows a given dynamic operation.

11. A method as claimed in claim 10, wherein an exponential dynamic operation expressed as follows is selected:

$$\frac{d(N - N_d^2)}{dt} = -\mu(N - N_d^2)$$

and $\mu$ is an experimentally defined gain.

12. A method as claimed in claim 1, wherein the setpoint pressure is converted to a desired speed value using maps of a compressor associated with the turbocharger.

13. A method as claimed in claim 12, wherein the physical relation is obtained from an equilibrium relation between turbine power and compressor power, by using a mass equilibrium principle for the intake manifold and for an exhaust manifold and using a back-stepping technique wherein a control is defined providing the turbocharger speed which follows a given dynamic operation.

14. A method as claimed in claim 13, wherein an exponential dynamic operation expressed as follows is selected:

$$\frac{d(N - N_d^2)}{dt} = -\mu(N - N_d^2)$$

and $\mu$ is an experimentally defined gain.

15. A method as claimed in claim 1, wherein the physical relation is obtained from an equilibrium relation between turbine power and compressor power, by using a mass equilibrium principle for the intake manifold and for an exhaust manifold and using a back-stepping technique wherein a control is defined providing the turbocharger speed which follows a given dynamic operation.

16. A method as claimed in claim 15, wherein the physical relation is obtained from an equilibrium relation between turbine power and compressor power, by using a mass equilibrium principle for the intake manifold and for an exhaust manifold and using a back-stepping technique wherein a control is defined providing the turbocharger speed which follows a given dynamic operation.

17. A method as claimed in claim 15, wherein an exponential dynamic operation expressed as follows is selected:

$$\frac{d(N - N_d^2)}{dt} = -\mu(N - N_d^2)$$

and $\mu$ is an experimentally defined gain.

18. A method as claimed in claim 1, wherein the control law is estimated by approximating the map of the turbine.

19. A method as claimed in claim 1, wherein the map of the turbine is approximated by using equations as follows:

$$W_t = (a \cdot G(U_{VGT}) + b) \cdot \Psi(PR_t)$$

with:
a and b being two parameters to be identified;
$U_{VGT}$ being an actuator control law;
$G(U_{VGT})$ being a bijective polynomial function of $U_{VGT}$;

$$\Psi(PR_t) = \sqrt{\frac{2\gamma \cdot PR_t}{\gamma(\gamma-1)}} \cdot \sqrt{PR_t^{\frac{-2}{\gamma}} - PR_t^{\frac{-\gamma-1}{\gamma}}}$$

$\gamma$ being a specific heat ratio.

20. A method as claimed in claim 19, wherein the parameters a and b are identified by offline optimization.

21. A method as claimed in claim 19, wherein the parameters a and b are corrected on line by an integrator with the pressure ratio in the turbine following the desired ratio.

* * * * *